United States Patent [19]

McMillan et al.

[11] Patent Number: 5,199,145
[45] Date of Patent: Apr. 6, 1993

[54] CORPORATE STOP ASSEMBLY

[75] Inventors: Jim S. McMillan, Benbrook; Simon Tarsha, Forth Worth, both of Tex.

[73] Assignee: Pipe Rehab International, Inc., Memphis, Tenn.

[21] Appl. No.: 672,877

[22] Filed: Mar. 21, 1991

[51] Int. Cl.⁵ .............................................. B23P 19/04
[52] U.S. Cl. ................... 29/237; 29/243.55; 29/523; 29/890.148; 285/197
[58] Field of Search ............... 29/237, 509, 510, 512, 29/525.1, 523, 890.14, 890.141, 890.144, 890.148, 282; 138/89; 285/196, 197, 208, 222, DIG. 18; 403/194

[56] References Cited

U.S. PATENT DOCUMENTS

| | | |
|---|---|---|
| 614,547 | 11/1898 | Haworth . |
| 633,537 | 9/1899 | Stewart . |
| 1,307,755 | 6/1919 | Ross . |
| 2,021,176 | 11/1935 | Curtis . |
| 3,333,724 | 8/1967 | Croft et al. . |
| 3,613,936 | 10/1971 | Kaiser ............................. 138/89 X |
| 3,694,009 | 9/1972 | Phillips ............................. 285/197 |
| 3,730,565 | 5/1973 | Steudler, Jr. .................... 285/197 X |
| 4,303,101 | 12/1981 | Tholen ............................. 138/89 |
| 4,411,458 | 10/1983 | Strunk et al. ................... 29/523 X |
| 4,509,243 | 4/1985 | Schneider et al. . |
| 4,634,307 | 1/1987 | Gnaedinger et al. ............ 403/194 |
| 4,654,942 | 4/1987 | Rush et al. ...................... 285/197 X |

OTHER PUBLICATIONS

Hays, Hays-Seal Corporation Stops, A Non-dated Page copied From A Hays' Catalog.

Primary Examiner—Joseph M. Gorski
Assistant Examiner—Peter Dungba Vo
Attorney, Agent, or Firm—Charles D. Gunter, Jr.

[57] ABSTRACT

A corporate stop is shown for sealing an opening in the sidewall of a host pipe. The stop has a threaded stem with an enlarged head portion and a neck portion of reduced size. A flexible sleeve member is received about the neck portion of the stem and has an upper end and a lower end which accommodates the enlarged head portion of the stem. A compression washer has an upper side and a lower side which fits about the sidewall of the conduit. The washer also has an opening which is alignable with an opening provided in the sidewall of the conduit. The lower side of the washer has a recess for receiving the upper end of the sleeve member when the stop is installed on the conduit performing an external seal with respect to the conduit. A clamp nut is engageable with the neck portion of the threaded stem for forcibly moving the lower end of the sleeve member over the head portion of the stem to expand the lower end of the sleeve member and form an internal seal with an opening in the conduit.

4 Claims, 5 Drawing Sheets

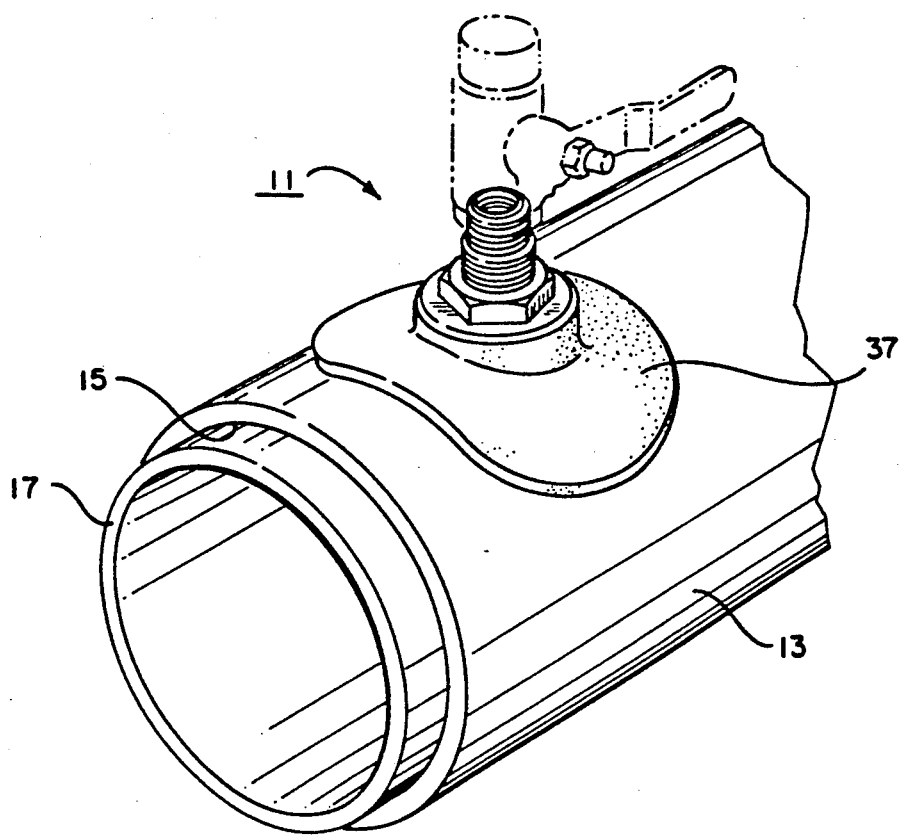
FIG. 1
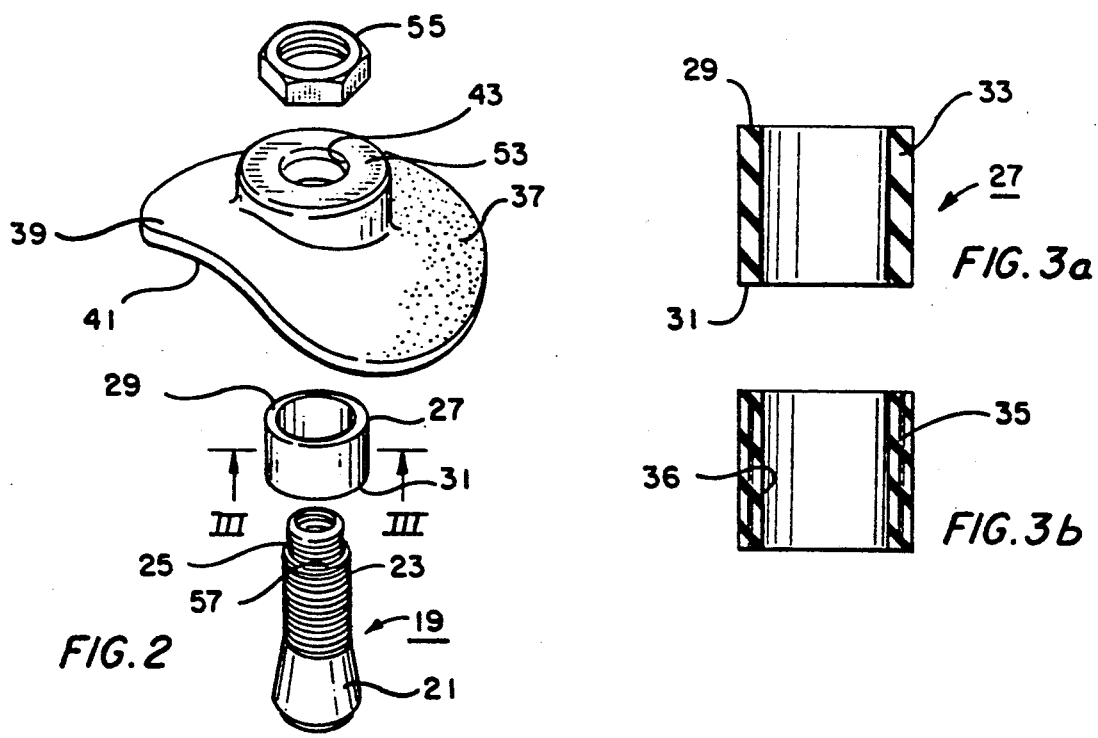
FIG. 2
FIG. 3a
FIG. 3b

CORPORATE STOP ASSEMBLY

BACKGROUND OF THE INVENTION

1. Field of the Invention

The present invention relates to a corporate stop of the type adapted to be installed in the sidewall of a fluid bearing conduit to form a junction or branch and, specifically, to such a stop which is adapted for installation within a lined conduit while the conduit is carrying fluid under pressure.

2. Description of the Prior Art

A variety of circumstances exist in which it is desirable to form a junction or branch line from a main, fluid carrying conduit. For instance, in the municipal area, it is often necessary to install a branch line into a water main, gas or sewer main. A similar need exists in other industries, such as in the chemical pipeline industries.

In the municipal area, many water mains were constructed years ago and the wall structures are now badly eroded or collapsing In order to repair such damage, it has been proposed to insert a liner within these lines to provide a new water-impervious wall to the system. However, the wall of the line, is usually not continuous since branch lines intersect the main line at various entry ports to allow the free flow of fluid from the main to the branch line. In the case of existing and newly formed entry ports, it is desirable to utilize a corporate stop at the junction to control the fluid on either a temporary or permanent basis.

Although a variety of corporate stops are known in the prior art, all suffer from various deficiencies. Many of the prior art assemblies are complicated in design and time consuming to install. In many cases, it was not possible to install the stop on a "live" line which was carrying fluid under pressure. Also, none of the prior art stops of which we are aware were well suited for installation in a conduit which had been previously lined with a synthetic liner.

The present invention has as an object to provide a corporate stop for a fluid carrying conduit which allows blind side installation by drilling a hole straight through the conduit from the exterior.

Another object of the invention is to provide such a stop which seals on both the interior and exterior sidewalls of the fluid carrying conduit.

Another object of the invention is to provide a stop which more securely engages a previously installed synthetic liner within a conduit to eliminate any annular gaps which might be present between the liner and host conduit.

Another object is to provide a stop which provides an enlarged contact area on the exterior of the host conduit for distributing forces generated during installation over a larger area.

Another object of the invention is to provide a sealing element for the corporate stop which is linearly and radially reinforced to resist shear forces during installation and reduce the chances of a blowout during the operational life of the stop.

SUMMARY OF THE INVENTION

The corporate stop of the invention is adapted for blind side sealing of an opening provided in a sidewall of a longitudinally extending conduit. The corporate stop includes a threaded stem having an enlarged head portion and a neck portion of reduced size, the neck portion terminating in an extension portion. A resilient sleeve member is received about the neck portion of the stem. The sleeve member has an upper end and a lower end adapted to accommodate the enlarged head portion of the threaded stem. A compression washer having an upper side and a lower side is contoured to fit the external sidewall of the conduit. The compression washer has an opening which is alignable with the opening provided in the sidewall, of the host conduit. The lower side of the compression washer has a recess which is provided for receiving the upper end of the resilient sleeve member when the stop is installed on the conduit for forming an external seal with respect to the external sidewall of the conduit. A clamp nut is engageable with the neck portion of the threaded stem for forcibly moving the lower end of the sleeve member over the conical head portion of the threaded stem to expand the lower end of the sleeve member and form an internal seal with the opening provided in the host conduit. The resilient sleeve member is preferably formed of an elastomeric material which is linearly and radially reinforced with metallic belting.

In the method of installing the corporate stop on a live, fluid carrying conduit, a portion of the host conduit is first enclosed within a sealed enclosure. The sealed enclosure is provided with a plurality of operating stations which are sequentially alignable over a selected position on the exterior of the conduit. A first station includes a hole forming means for forming an opening in the conduit sidewall. A second station includes a stop insertion means for inserting the stop within the previously provided opening and for installing the stop in sealed relation within the opening. A third station includes a coupling installation means for installing a pipe coupling onto the previously installed stop. After forming an opening in the conduit at the hole forming station, the second station is moved into alignment with the opening. The stop is then inserted and installed in sealed relation to the host conduit within the sidewall opening The third station is then moved into alignment with the stop and a pipe coupling is installed to seal off the opening in the sidewall of the host conduit. The sealed enclosure can then be removed from the conduit to complete the operation.

Additional objects, features and advantages will be apparent in the written description which follows.

BRIEF DESCRIPTION OF THE DRAWINGS

FIG. 1 is a partial, perspective view of a fluid carrying conduit having the corporate stop of the invention installed thereon with a pipe coupling being shown in phantom lines;

FIG. 2 is an isolated, exploded view of the corporate stop of the invention;

FIG. 3a is a first embodiment of the resilient sleeve member which comprises the sealing element of the stop of the invention;

FIG. 3b shows another embodiment of the resilient sleeve member of the invention which is radially and linearly reinforced with metallic belting;

DETAILED DESCRIPTION OF THE INVENTION

Figure 4:
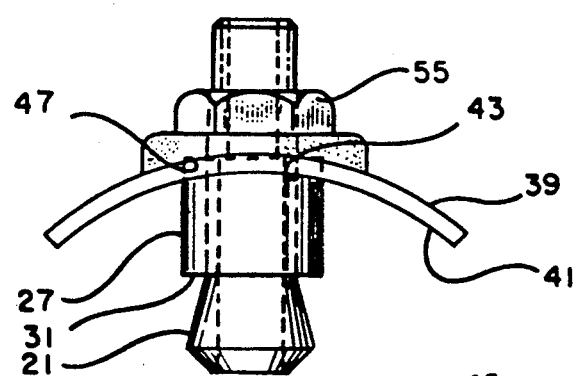
FIG. 4 is a partial, cross-sectional view of the fluid carrying conduit showing the stop of the invention about to be inserted within an opening previously provided in the conduit sidewall.

Turning to FIG. 1 there is shown a corporate stop of the invention, designated generally as 11, in place on a longitudinally extending host conduit 13. The host conduit or pipe 13 could be, for instance, a water main, gas main, sewer pipe, or the like. In this case, the pipe 13 is of steel and has a generally cylindrical interior sidewall 15 which has been lined with a synthetic liner 17 formed from a polyolefin, e.g. polyethylene. Processes for lining conduit will be familiar to those skilled in the art and are described, for instance, in Applicants' issued U.S. Pat. No. 4,923,663, issued May 8, 1990, entitled METHOD OF LINING TUBULAR MEMBERS INCLUDING ROLLING AND CRUSHING A LINER.

FIG. 2 shows the corporate stop 11 of the invention in exploded fashion. The corporate stop includes a threaded stem 19 having, in sequential relation, an enlarged, conically-shaped head portion 21 and a neck portion 23 of reduced size. The neck portion 23 terminates in an extension portion 25.

A resilient sleeve member 27 formed of a flexible, elastomeric material is received about the neck portion 23 of the stem 19. The sleeve member 27 has an upper end 29 and has a lower end 31 which is adapted to accommodate the enlarged head portion 21 of the threaded stem 19 during assembly. As shown in FIGS. 3a and 3b, the sleeve member 27 can conveniently be provided as a generally cylindrical body 33 which can be linearly and radially reinforced, as with the steel belting 35 shown in FIG. 3b. The steel belting 35 is encapsulated within the sidewalls of the body 33, circumscribing the internal bore 36.

The corporate stop also includes a compression washer 37 (FIG. 2) which has an upper side 39 and a lower side 41 which is contoured to fit the external sidewall of the host conduit 13. The compression washer 37 has a central opening 43 (FIGS. 2 and 4) which is alignable with the opening 45 provided in the sidewall of the conduit 13. The lower side 41 of the compression washer 37 is provided with a recess 47 for receiving the upper end 29 of the sleeve member 27 when the stop is installed within the host conduit 13 for forming an external seal with respect to the conduit. The seal area is illustrated at approximately 49 in FIG. 5. The upper side 39 of the compression washer 37 also has a central raised portion 51 which forms a protruding collar with respect to the remainder of the washer upper side 39. The collar has a top, generally planar surface 53 for receiving a clamp nut 55 and a central opening which is alignable with the opening in the conduit. The sleeve receiving recess 47 can conveniently be provided in the bottom surface of the collar 51, as shown in FIG. 4.

As shown in FIG. 2, the extension portion 25 of the stem 19 is of lesser relative diameter than the neck portion 23, thereby forming a step 57 with respect to the neck portion 23. The extension portion 25 is selectively sized to matingly engage the iron pipe thread of a pipe coupling installed on the exterior of the conduit during a later step in the installation. The clamp nut 55 is engageable with the neck portion 23 of the threaded stem 19 for forcibly moving the lower end 31 of the resilient sleeve member 27 over the conical head portion 21 of the threaded stem to expand the lower end 31 of the sleeve member 19 and form an internal seal with the opening 45 in the lined conduit 13.

Figure 5:
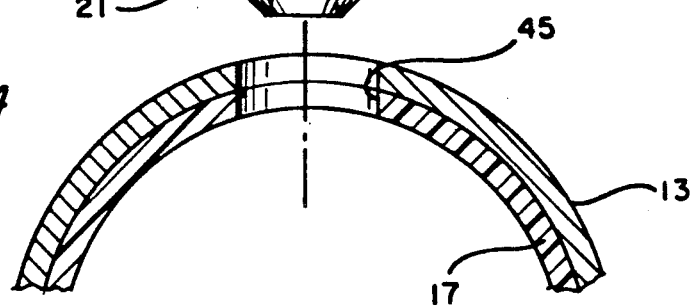
FIG. 5 is a view similar to FIG. 4 showing the unengaged stop positioned within the opening previously provided in the conduit.
Figure 6:
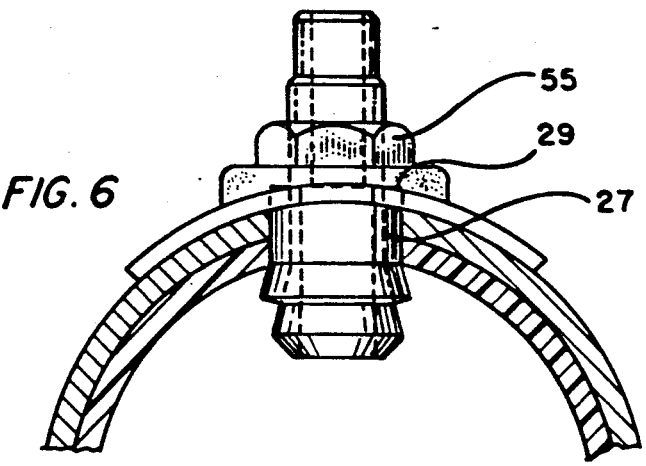
FIG. 6 is a view similar to FIG. 5 showing the corporate stop engaged in sealed relation within the fluid carrying conduit.

FIGS. 4-6 illustrate the installation of the corporate stop 11 within an opening provided in the host conduit 13. FIG. 4 illustrates the relative arrangement of the components of the stop prior to installation within the host conduit 13. The resilient sleeve member 27 is in the relaxed position. FIG. 5 shows the corporate stop 11 after insertion but prior to having been moved into sealing engagement with the host conduit. The clamp nut 55 is threaded about the upper extent of the neck portion 23 but has not been tightened fully. The lower end 31 of the sleeve 27 has not been expanded over the conical head portion 21 of the threaded stem 19. FIG. 6 shows the completed installation which is accomplished by tightening the clamp nut 55. As the clamp nut moves down the neck portion of the threaded stem 19, the lower end 31 of the sleeve 27 is flared outwardly, thereby engaging the opening provided within the liner 17 and conduit 13, thereby clamping the liner to the internal sidewall of the conduit and eliminating any gaps which might be present in the annular region 59 between the liner and conduit. The compression washer 37 spreads the installation forces applied by the clamp nut 55 over an expanded area on the external sidewalls of the conduit. The resilient sleeve upper end 29 forms an external seal between the washer and external sidewalls of the host conduit 13.

FIGS. 7-13 illustrate a method and apparatus for installing the corporate stop of the invention on a live conduit carrying fluid under pressure. In order to accomplish the installation on a live conduit, it is necessary to install a sealed enclosure 61 on the exterior surface 63 of the conduit 13. As will be more fully explained, the sealed enclosure 61 is provided with a plurality of operating stations which are sequentially alignable over a selected position on the external sidewalls 63 of the conduit 13. The enclosure 61 preferably includes a slidable wall member 65 with each operating station being mounted on the slidable wall member in fluid tight fashion. The stations illustrated in FIG. 7 include a hole forming station 67 having means for forming an opening in the conduit external sidewall, a stop insertion station 69 for inserting and engaging the stop within the previously provided opening, and a third station 71 comprising a coupling installation station for installing a pipe coupling onto the previously installed stop.

Figure 7:
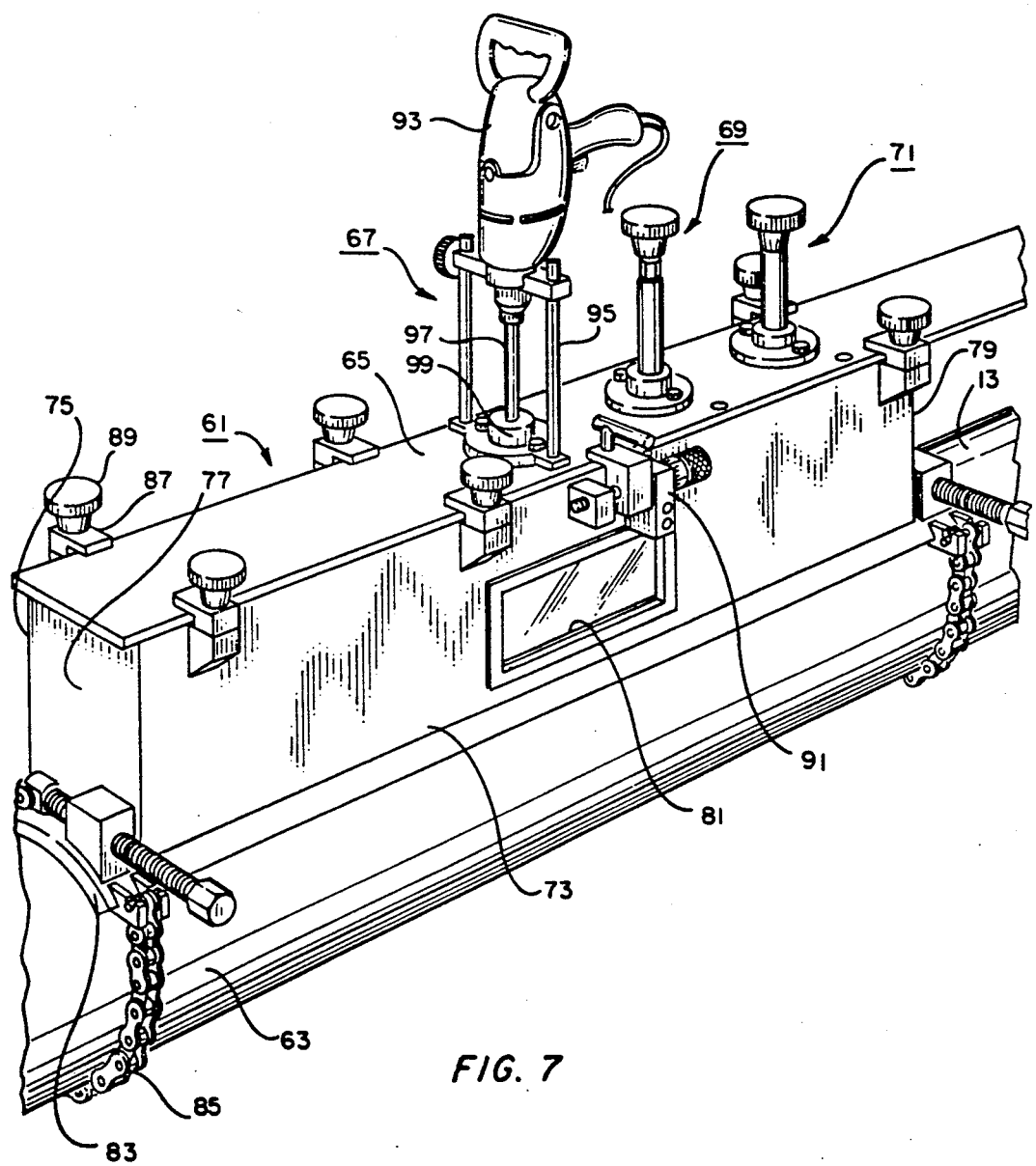
FIG. 7 is a perspective view, partly broken away, of the sealed enclosure which is used during the installation of the corporate stop on a live, fluid carrying conduit.

In the embodiment illustrated in FIG. 7, the sealed enclosure is a generally rectangular-shaped box having connecting sidewalls 73, 75, a leading end 77, a trailing end 79, and having a viewing window 81. The sealed enclosure 61 also includes front and rear arcuate surfaces 83 having engagement means, such as chain clamp 85 for securing the enclosure about the conduit exterior. A plurality of flange clamps 87 can be tightened, as by knobs 89, in order to secure the slidable wall member 65 in a selected longitudinal position with respect to the box sidewalls. A micrometer adjustment 91 allows the longitudinal position of the slidable wall 65 to be precisely determined.

Figure 8:
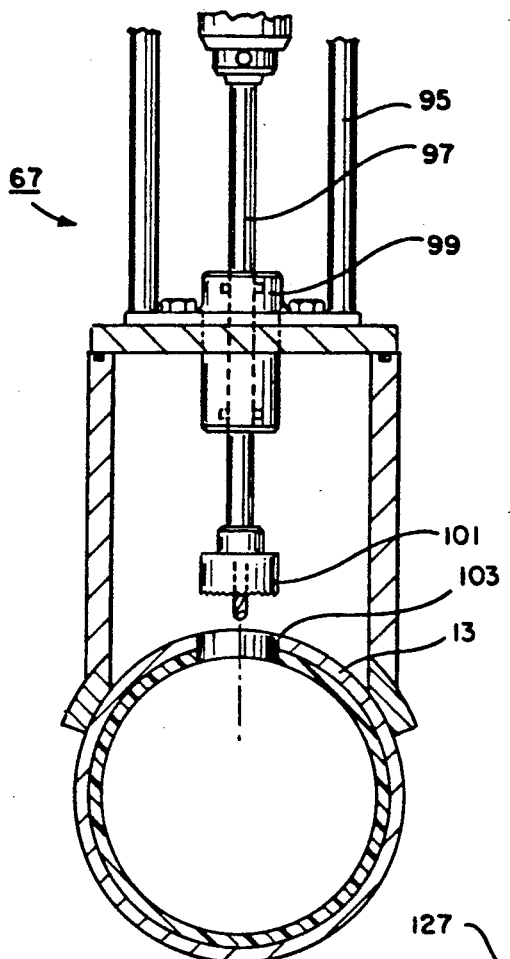
FIG. 8 is a simplified, end view of the sealed enclosure of FIG. 7 showing the hole forming means thereof.

As shown in FIGS. 7 and 8, the hole forming station includes an electric drill 93 mounted on a vertically adjustable fixture 95 which allows the bit shaft 97 to travel vertically within a seal member 99 provided on the slidable wall member 65. As shown in FIG. 8, this allows the bit 101 to be lowered vertically to a desired location 103 on the external sidewalls of the conduit for drilling a hole downwardly through the conduit while maintaining a fluid tight seal within the sealed enclosure 61.

Figure 9:
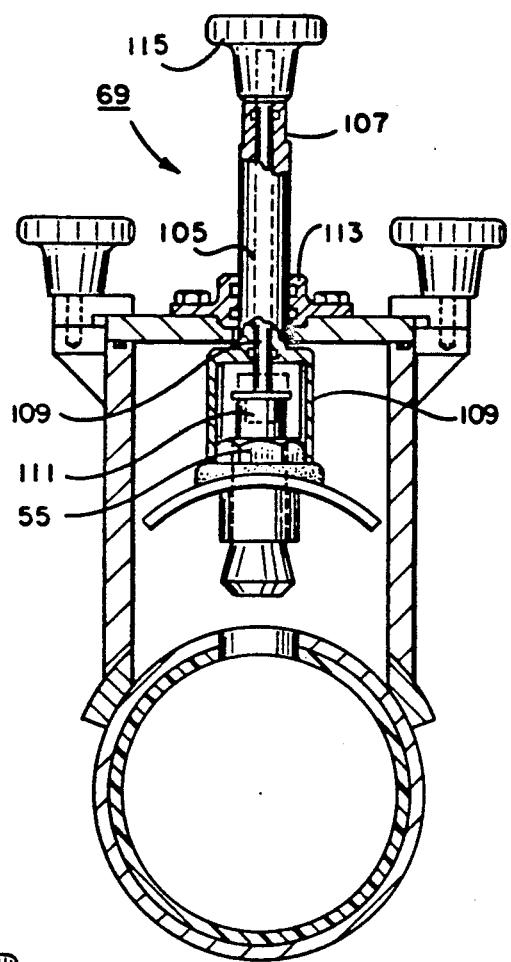
FIG. 9 is a view similar to FIG. 8 showing the stop insertion station used to insert the stop within the opening provided in the conduit.

FIG. 9 shows the stop insertion apparatus present at the second station 69. The apparatus includes a vertically extending shaft 105 having wrench flats 107 for turning socket 109 provided within the enclosure. The shaft 105 also has an internal bore which receives an internal extension 109 having an externally threaded lower extent 111 for engaging internal threads provided within the upper most extent of the extension portion 25 of the threaded stem 19.

To install the stop, the shaft 105 is moved vertically downward within its seal means 113 until the stop has been inserted within the pipe opening in the position shown in FIG. 5 The stop is then engaged within the opening by turning the shaft 105 in a clockwise direction utilizing the wrench flats 107. This causes the socket 109 to tighten the clamp nut 55 on the threaded stem 19, thereby causing the stop to assume the sealed position shown in FIG. 6. The installation apparatus is then released from the stop by turning the knob 115 and internal extension 109 in a clockwise direction to release the left-hand threads on the lower extent 111 of extension 109. The shaft 105 can then be pulled vertically upward to disconnect the installation apparatus from the stop.

Figure 10:
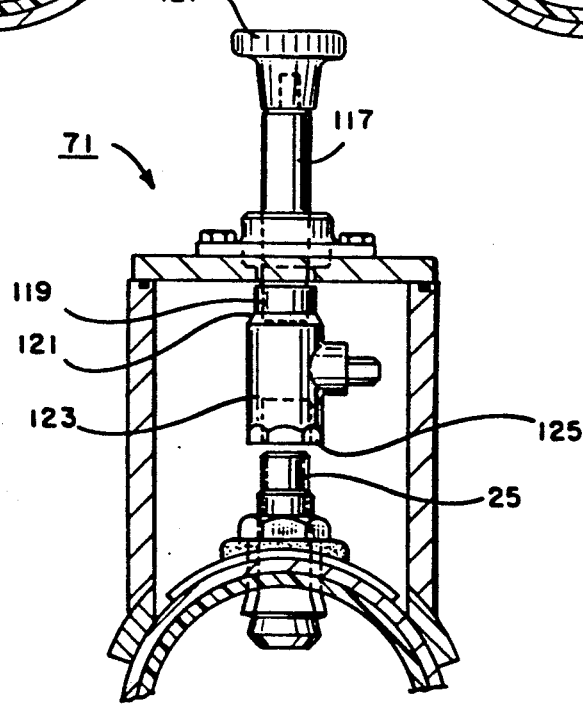
FIG. 10 is a view similar to FIG. 9 showing the pipe coupling station in which a pipe coupling is engaged with the previously installed stop.

FIG. 10 shows the coupling installation station 71 which includes a vertically slidable shaft 117 having an externally threaded lower extent 119 having right hand threads for engaging the mating, internally threaded neck 121 of a ball valve 123. The ball valve has a lower, internally threaded extent 125 which is adapted to matingly engage the extension portion 25 of the threaded stem of the coupling. The pipe coupling is lowered vertically into position and the knob 127 is turned clockwise to engage the mating, threaded surfaces of the stem extension portion 25 and threaded extent 125 of the ball valve. The shaft 117 is then released from the pipe coupling by turning the knob 127 in a counterclockwise direction. Shaft 117 is raised vertically upward to complete the installation.

Figure 11:
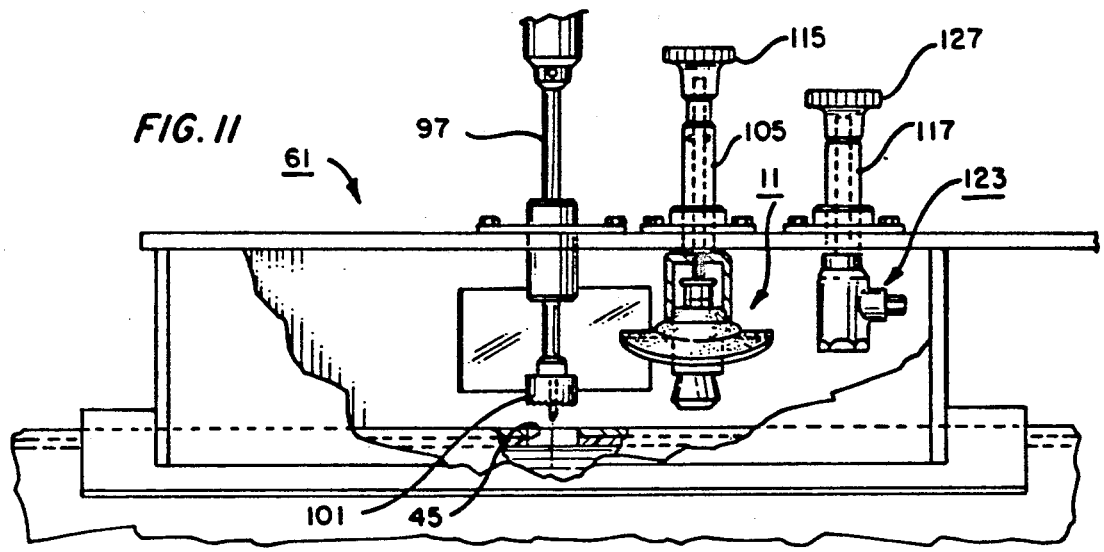
FIGS. 11-13 are side, operational views, showing the steps in the installation of the stop of the invention in sequential fashion.
Figure 12:
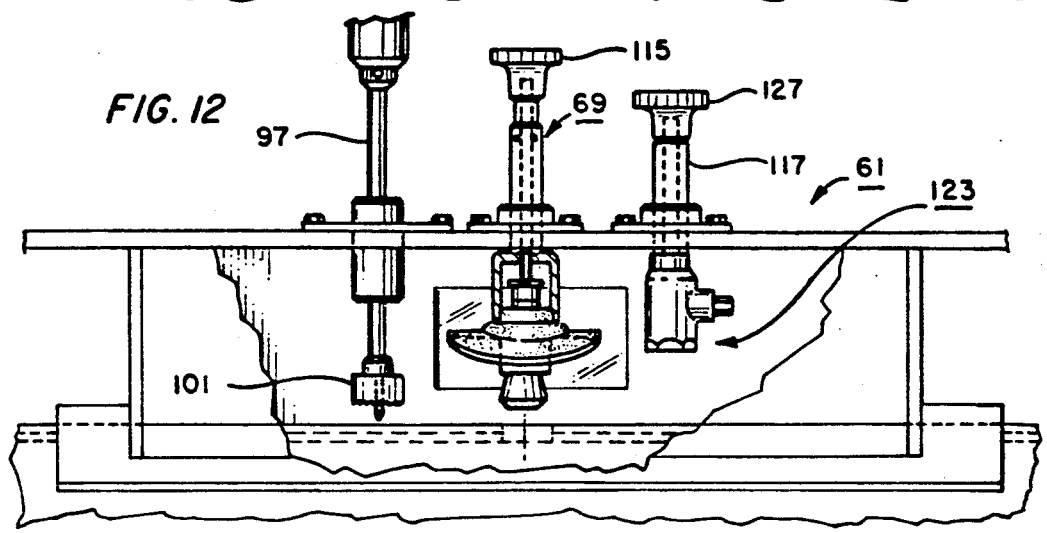
Figure 13:
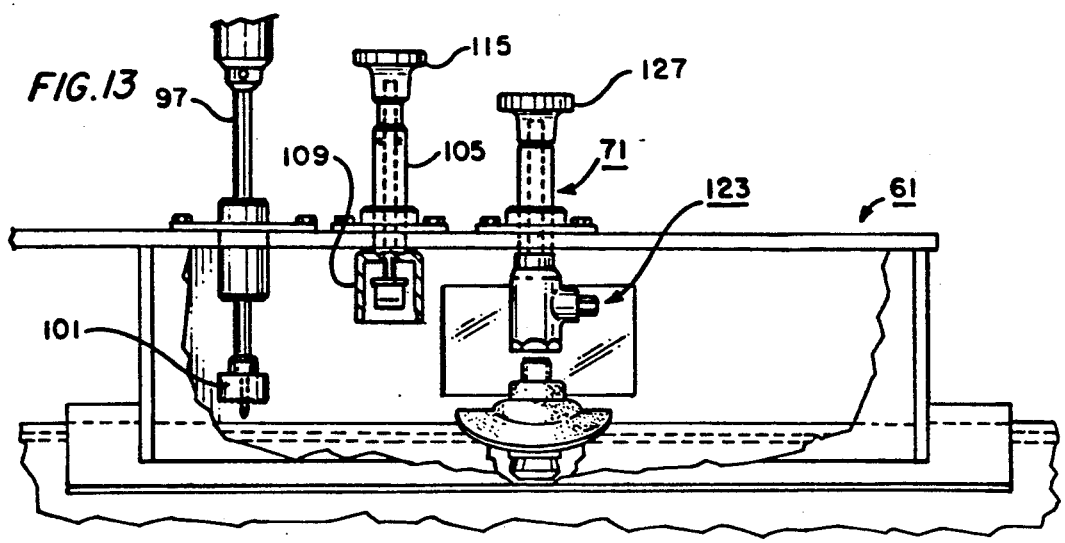

FIGS. 11-13 further illustrate the previously described sequence of operations. FIG. 11 shows the drill bit 101 being raised vertically from the previously drilled hole 45 provided in the external sidewall of the conduit 13. The stop 11 and pipe coupling 123 have not yet been lowered into operative position. After drilling the hole 45, the flange clamps 87 are loosened, allowing the slidable wall member 65 to be moved in the left-hand direction, as viewed in FIG. 11, thereby positioning the stop insertion station 69 in the position shown in FIG. 12. Clamps 87 are tightened to secure the slidable wall member 65 in the new position. After installing and engaging the stop as previously described, the flange clamps 87 are again loosened, allowing the slidable wall member 65 to move the pipe coupling station 71 to the position shown in FIG. 13. After tightening the flange clamps 89, the pipe coupling is installed as previously described After completing each of the steps in the installation, the sealed enclosure can be removed from the conduit with the ball valve 123 being used to control the flow of fluid to or from the host conduit.

An invention has been provided with several advantages. The corporate stop of the invention is simple in design and economical to manufacture. The stop allows blind side installation and is particularly adapted for use with lined conduits The reinforced sleeve component of the stop prevents blowouts and resists shear forces more effectively than did prior art designs Also, the arrangement of the sleeve member within the recess provided on the lower surface of the compression washer allows both an internal and external seal to be formed about the conduit opening. The sealed enclosure and multiple installation stations allow the stop to be installed on a live conduit conveying fluid under pressure.

While the invention has been shown in only one of its forms, it is not thus limited but is susceptible to various changes and modifications without departing from the spirit thereof.

What is claimed is:

1. A corporate stop for blind side sealing of an opening provided in an external sidewall of a longitudinally extending conduit of the type lined with a synthetic liner also having a concentric opening, the corporate stop comprising:

a threaded stem having an enlarged, conical head portion and a neck portion of reduced size, the neck portion terminating in an extension portion;

a resilient sleeve member coaxially surrounding the neck portion of the stem, the sleeve member having an upper end and having a lower end adapted to accommodate the enlarged, conical head portion of the threaded stem;

a compression washer having an upper side and a lower side which is contoured to fit the sidewall of the conduit, the compression washer having an opening which is alignable with the opening provided in the external sidewall of the conduit and in the liner, the lower side of the compression washer having a sleeve receiving recess provided for receiving the upper end of the sleeve member when the stop is installed on the conduit for forming an external seal between the compression washer and the external sidewall of the conduit;

a clamp nut engageable with the neck portion of the threaded stem for forcibly moving the lower end of the sleeve member over the enlarged, conical head portion of the threaded stem to expand the lower end of the sleeve member and form an internal seal with the opening in the lined conduit;

wherein the resilient sleeve member is formed of an elastomeric material, the material being linearly and radially reinforced; and wherein the upper side of the compression washer has a central raised portion which forms a protruding collar, the collar having a top, generally planar surface for receiving the clamp nut, a bottom surface, and a central opening alignable with the opening in the conduit, and wherein the internal sleeve receiving recess is formed in the bottom surface of the protruding collar, the sleeve receiving recess having a greater diameter than the diameter of the central opening, the diameter of the sleeve receiving recess being selectively sized to receive the upper end of the resilient sleeve to form an external seal between the compression washer and the external sidewall of the conduit as the clamp nut is engaged with the neck portion of the threaded stem.

2. The corporate stop of claim 1, wherein the extension portion of the threaded stem is engageable with an iron pipe thread formed on a pipe coupling of the type adapted to be installed on the exterior of the conduit, the extension portion of the threaded stem being of lesser relative diameter than the neck portion, thereby forming a step with respect to the neck portion, the extension portion being selectively sized to matingly engage the iron pipe thread of the pipe coupling when the pipe coupling is installed on the exterior of the conduit.

3. The corporate stop of claim 2, wherein the conduit is a metal pipe lined with a polyolefin liner.

4. A corporate stop for blind side sealing of an opening provided in an external sidewall of a longitudinally extending conduit of the type lined with a synthetic liner also having a concentric opening, the corporate stop comprising:
- a threaded stem having an enlarged, conical head portion and a neck portion of reduced size, the neck portion terminating in an extension portion;
- a resilient sleeve member coaxially surrounding the neck portion of the stem, the sleeve member having an upper end and having a lower end adapted to accommodate the enlarged, conical head portion of the threaded stem;
- a compression washer having an upper side and a lower side which is contoured to fit the sidewall of the conduit, the compression washer having an opening which is alignable with the opening provided in the external sidewall of the conduit and in the liner, the lower side of the compression washer having a sleeve receiving recess provided for receiving the upper end of the sleeve member when the stop is installed on the conduit for forming an external seal between the compression washer and the external sidewall of the conduit;
- a clamp nut engageable with the neck portion of the threaded stem for forcibly moving the lower end of the sleeve member over the enlarged, conical head portion of the threaded stem to expand the lower end of the sleeve member and form an internal seal with the opening in the lined conduit;
- wherein the resilient sleeve member is formed of an elastomeric material; and
- wherein the upper side of the compression washer has a central raised portion which forms a protruding collar, the collar having a top, generally planar surface for receiving the clamp nut, a bottom surface, and a central opening alignable with the opening in the conduit, and wherein the internal sleeve receiving recess is formed in the bottom surface of the protruding collar, the sleeve receiving recess having a greater diameter than the diameter of the central opening, the diameter of the sleeve receiving recess being selectively sized to receive the upper end of the resilient sleeve to form an external seal between the compression washer and the external sidewall of the conduit as the clamp nut is engaged with the neck portion of the threaded stem.

* * * * *